April 4, 1939.　　F. W. FORTNEY ET AL　　2,152,957
WHEEL
Filed May 26, 1936
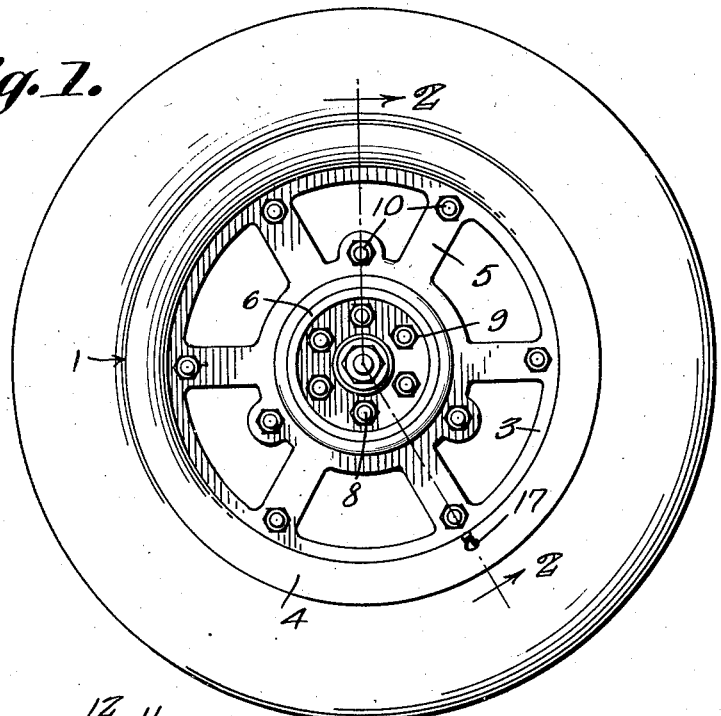
Fig. 1.
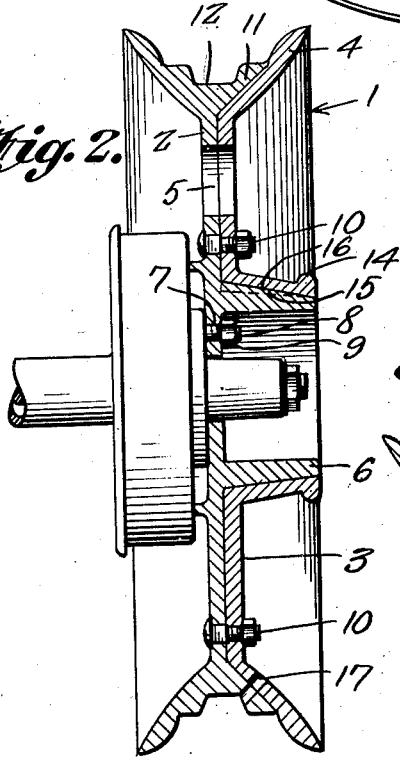
Fig. 2.
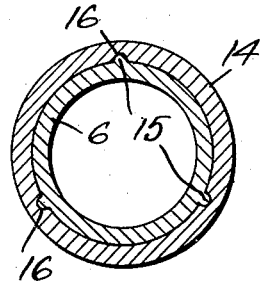
Fig. 3.
Fig. 4.
Fred W. Fortney,
Joe A. Bell,
INVENTORS
BY Victor J. Evans & Co.
ATTORNEYS
WITNESS P. J. Hickey.

Patented Apr. 4, 1939

2,152,957

UNITED STATES PATENT OFFICE 2,152,957

WHEEL

Fred W. Fortney and Joe A. Bell, Clayton, N. Mex.

Application May 26, 1936, Serial No. 81,928

1 Claim. (Cl. 301—63)

This invention relates to motor vehicle wheels and has for the primary object the provision of a device of this character which will greatly simplify the mounting and removing of tires and permit any one to easily and quickly change a tire without employing tire irons and similar tools and is readily adaptable to motor vehicle construction now in use.

With these and other objects in view, this invention consists in certain novel features of construction, combination and arrangement of parts to be hereinafter more fully described and claimed.

For a complete understanding of our invention, reference is to be had to the following description and accompanying drawing, in which Figure 1 is a side elevation illustrating a motor vehicle wheel constructed in accordance with our invention and showing a tire mounted thereon.

Figure 2 is a sectional view taken on the line 2—2 of Figure 1.

Figure 3 is a transverse sectional view illustrating the connection between the hub portions of the sections of the wheel.

Figure 4 is a fragmentary sectional view showing a modified form of our invention.

Referring in detail to the drawing, the numeral 1 indicates in entirety a motor vehicle wheel composed of companion sections 2 and 3. The sections 2 and 3 include tire engaging flanges 4, also the sections 2 and 3 include spokes 5. The section 2 has integral therewith a hub portion 6. The section 2 is provided with apertures 7 to receive the usual screw threaded studs 8 employed for securing a motor vehicle wheel in place. Nuts 9 may be easily threaded onto the studs by way of one end of the hub portion 6, thus rendering the wheel quickly demountable. The companion sections 2 and 3 are detachably connected by bolts 10 whereby the section 3 may be removed from the section 2 when desiring to mount a tire or remove a tire. The flange 4 of the section 2 is equipped with an integral annular extension 11 adapted to abut the flange 4 of the section 3. The extension 11 may present a channel 12 or may have a straight face 13, as shown in Figure 4, so that different types and makes of tires can be used in connection with the wheel.

The hub portion 8 is provided with a tapered outer face and formed on the section 3 is a hub portion 14 adapted to fit over the hub portion 6 when the sections 2 and 3 are assembled. Splines 15 are formed on the hub section 6 and fit within grooves 16 formed in the hub portion 14. The splines fitting within the grooves establish a drive connection between the hub portions of the sections 2 and 3 relieving the bolts 10 of the strain of preventing relative rotation between the sections 2 and 3. The usual valve opening 17 is provided for the inflating valve of the inner tube of the tire.

While the companion sections of the wheels have been described as including spokes, they also may be constructed in disc form.

Having described the invention, we claim:

A motor vehicle wheel comprising a first section and a second section, each having a tire engaging flange, a tapered hub carried by the first section, a tapered hub carried by the second section and keyed to said first hub, and an inwardly extending flange carried by said first hub, said inwardly extending flange being provided with openings for the reception of mounting bolts, said first hub being hollow to permit access to the inwardly extending flange, and means for connecting the first and second sections into a unitary structure.

FRED W. FORTNEY.
JOE A. BELL.